Sept. 22, 1970    J. L. DAUM ET AL    3,529,611
VEHICLE WASHING APPARATUS
Filed March 15, 1968    6 Sheets-Sheet 4
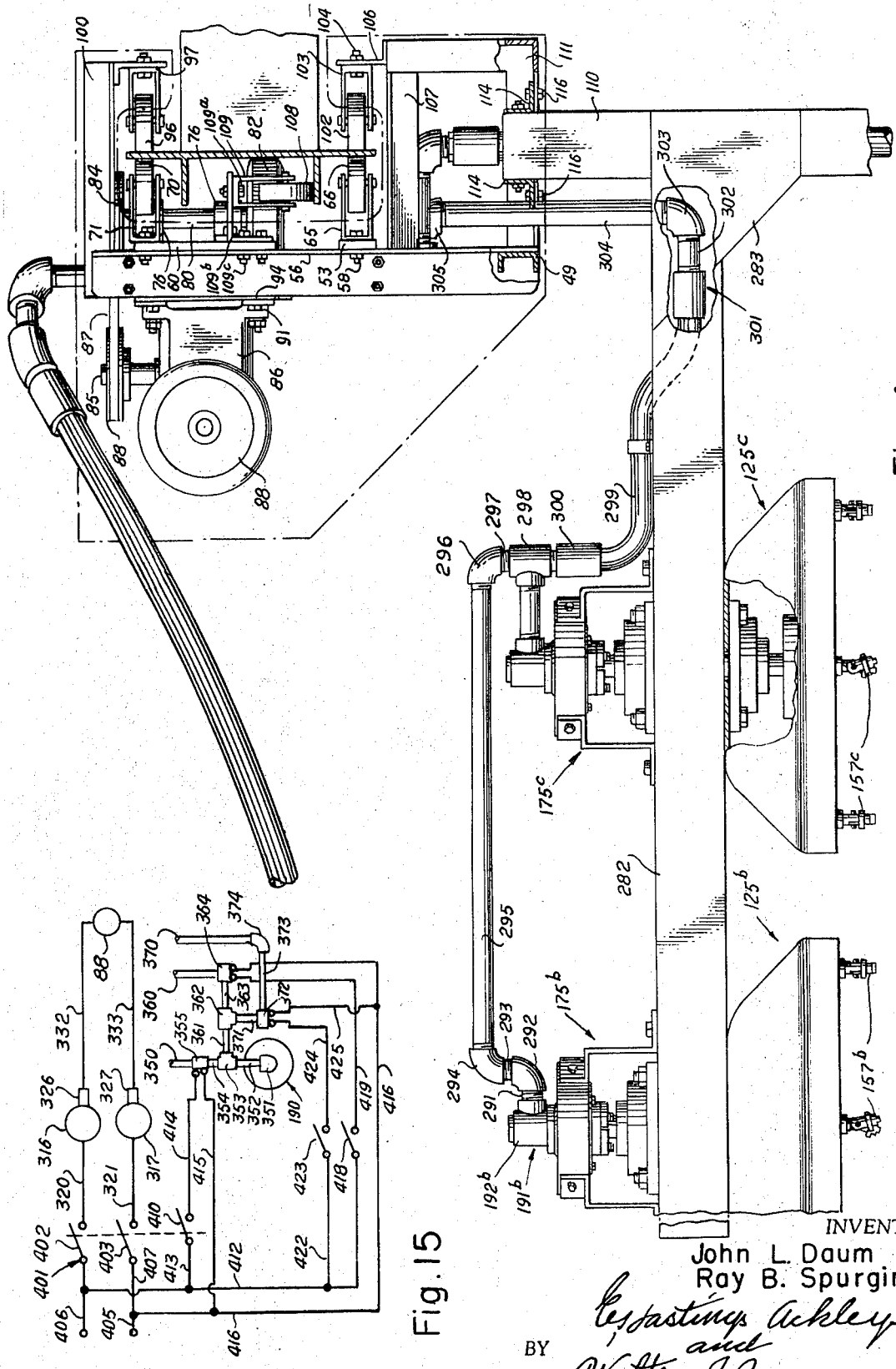
INVENTORS
John L. Daum
Ray B. Spurgin
BY
ATTORNEYS INVENTORS
John L. Daum
Ray B. Spurgin

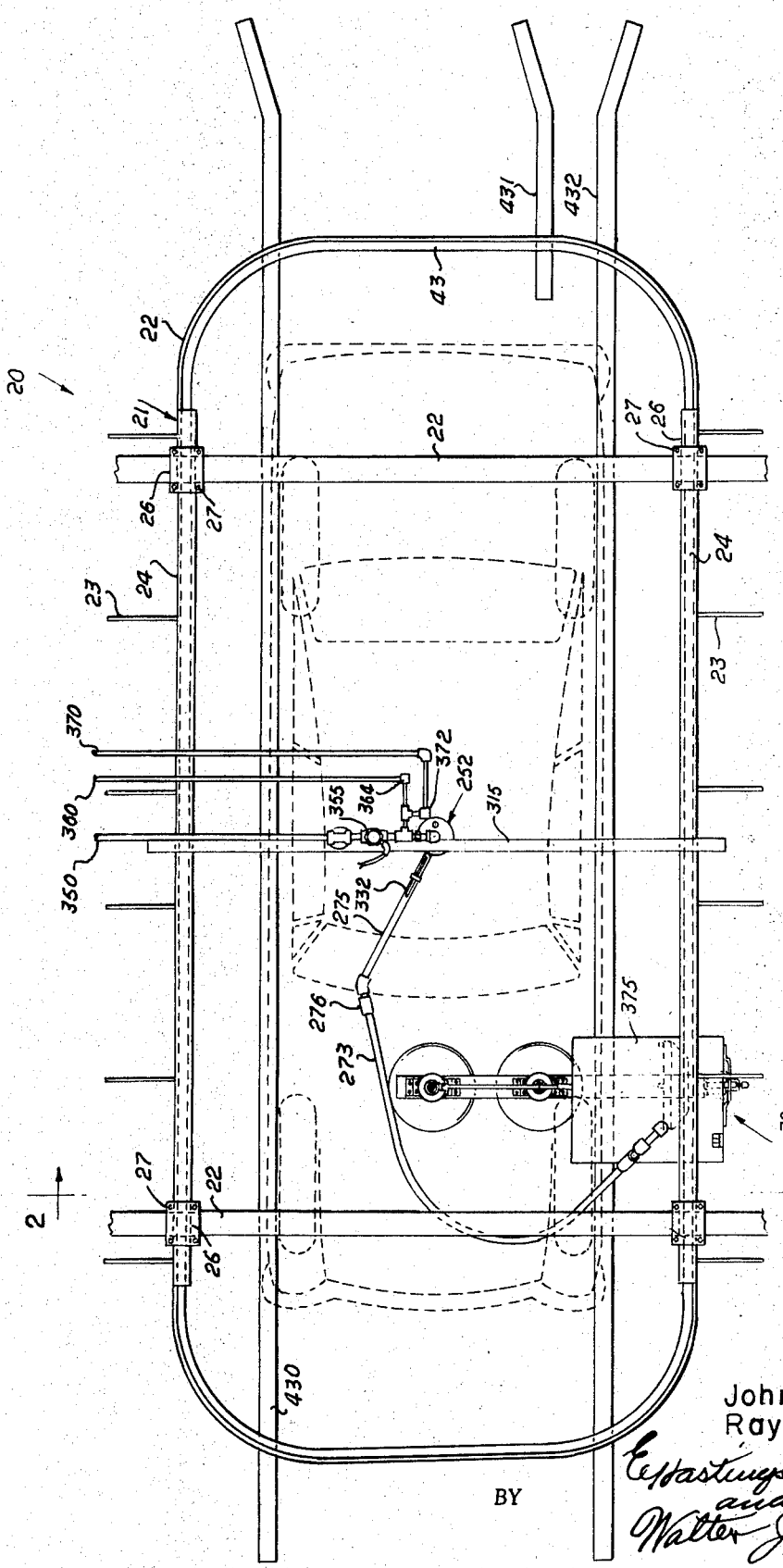

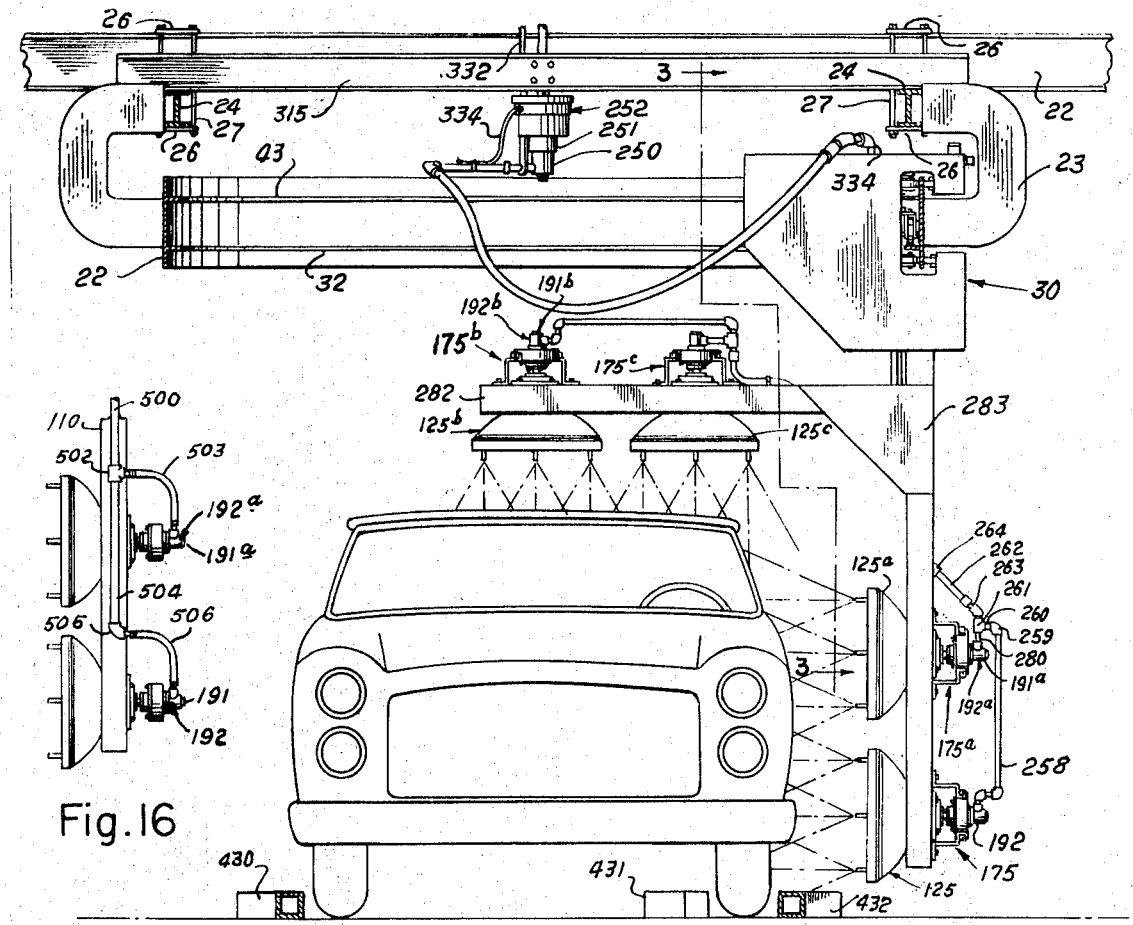
Fig. 16
Fig. 2
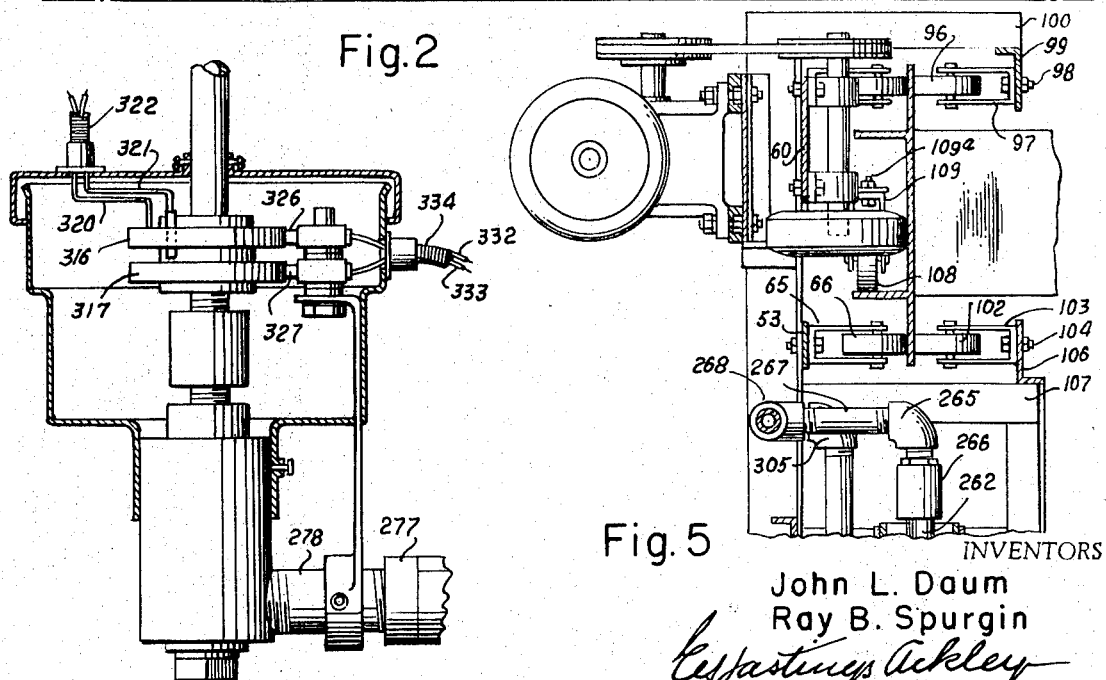
Fig. 6
Fig. 5
INVENTORS
John L. Daum
Ray B. Spurgin
BY
ATTORNEYS

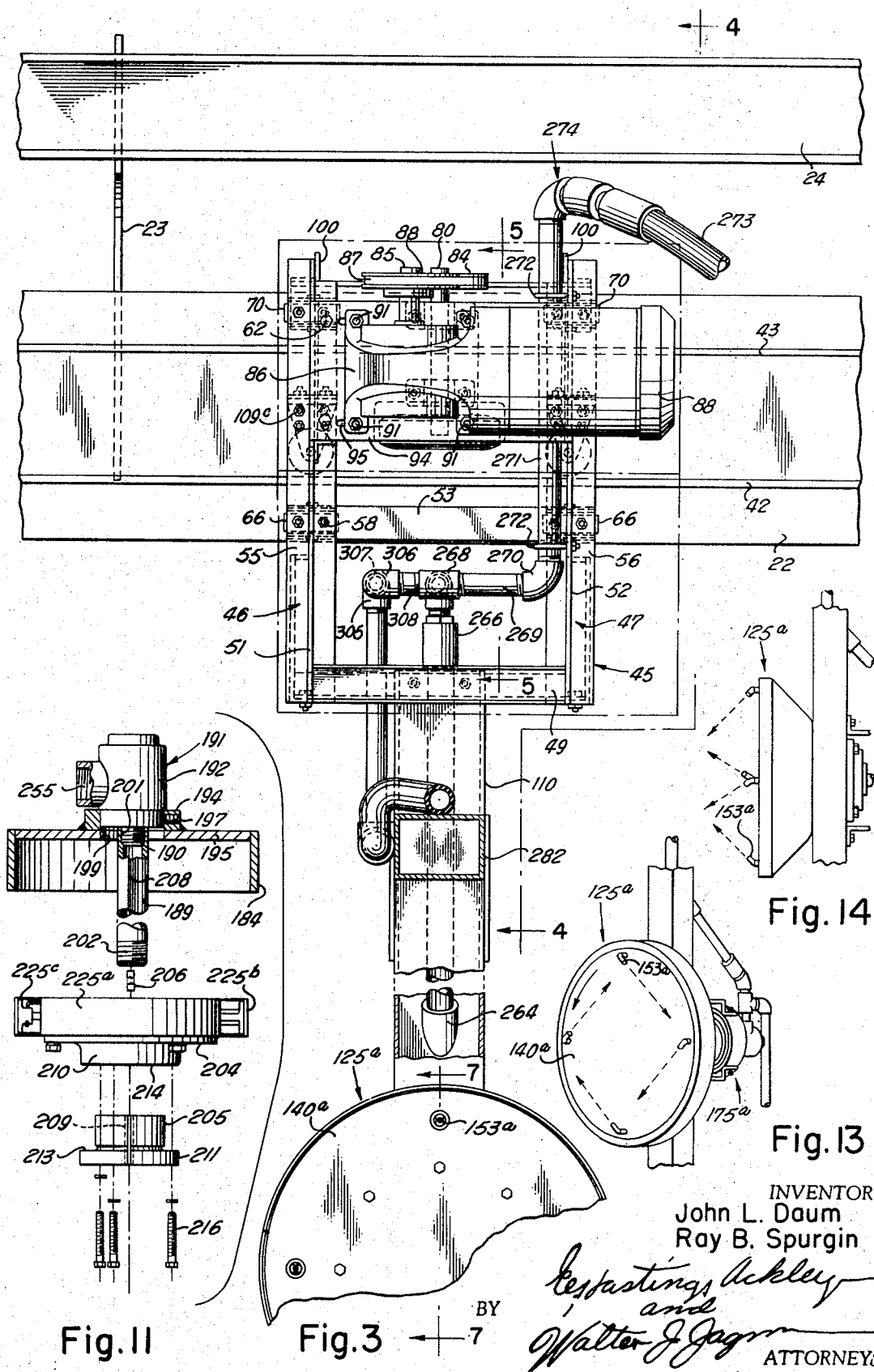

BY
ATTORNEYS

Sept. 22, 1970     J. L. DAUM ET AL     3,529,611

VEHICLE WASHING APPARATUS

Filed March 15, 1968     6 Sheets-Sheet 6

INVENTORS
John L. Daum
Ray B. Spurgin

BY

ATTORNEYS

United States Patent Office 3,529,611
Patented Sept. 22, 1970

---

3,529,611
VEHICLE WASHING APPARATUS
John L. Daum and Ray B. Spurgin, Dallas, Tex., assignors to Delta Manufacturing and Engineering Corporation, Dallas, Tex., a corporation of Texas
Continuation-in-part of applications Ser. No. 545,496, Apr. 26, 1966, and Ser. No. 667,780, Sept. 14, 1967. This application Mar. 15, 1968, Ser. No. 713,417
Int. Cl. B60s 3/04
U.S. Cl. 134—112   4 Claims

ABSTRACT OF THE DISCLOSURE

A vehicle washing apparatus having a carriage movable on a track about a vehicle and having a plurality of rotatable nozzle assemblies for directing sprays of liquid on the external surfaces of the vehicle.

---

Figure 7:
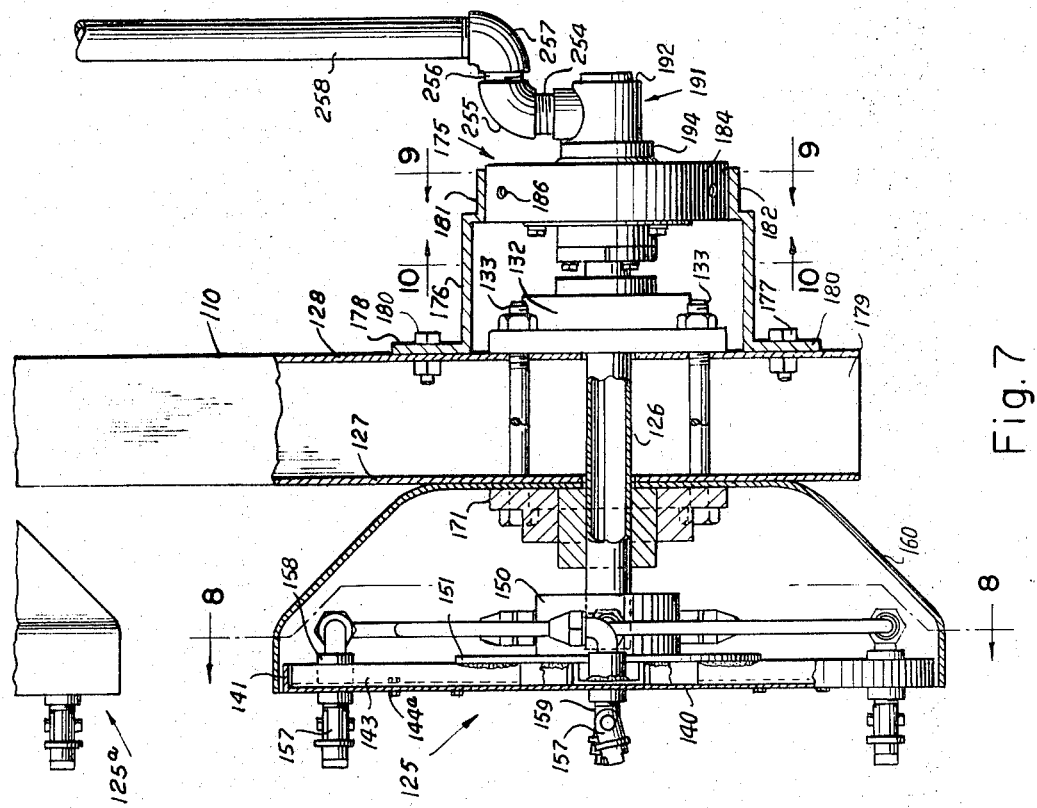

This application is a continuation-in-part of our co-pending application Ser. No. 545,496, filed Apr. 26, 1966, now Pat. No. 3,400,727 and of our co-pending application Ser. No. 667,780 filed Sept. 14, 1967.

This invention relates to washing apparatus and more particularly to apparatus for washing vehicles.

An object of this invention is to provide a new and improved vehicle washing apparatus for washing vehicles with a wash liquid, such as a hot solution of chemical and water and then rinsing the vehicle with a rinse liquid, such as hot water.

Another object is to provide a vehicle washing apparatus having a plurality of rotatable nozzle assemblies mounted on a carriage which direct sprays of liquid on the external surfaces of the vehicle at continuously varying angles of incidence to facilitate dislodgement of dirt particles and film adhering thereto, the carriage being movable about the vehicle.

Still another object is to provide a vehicle washing apparatus wherein the sprays of liquid are not directed upwardly at upper edge portions of the closures of the vehicle, such as the vertically movable windows thereof, at locations of their engagement with seal or gasket means of the vehicle to prevent leakage of the liquids into the vehicle since the seal means at the upper portion of the closures of the vehicle are not designed to prevent upward movement of the liquids therepast.

A further object is to provide a vehicle washing apparatus having rotatable nozzle assemblies, each having a plurality of circumferentially spacel nozzles for directing sprays of liquid at the surfaces of the vehicle, wherein the nozzle assemblies are rotatable by the force of the liquid under pressure sprayed through the nozzles thereof.

A still further object is to provide a washing apparatus having means for limiting the speed of rotation of the nozzle assemblies.

Still another object is to provide a washing apparatus wherein the speed of rotation of the nozzle assemblies is maintained substantially constant by a speed control means which yieldably resists rotation of the nozzle assemblies with a force which varies in accordance with the speed of rotation of the nozzle assemblies to compensate for variations in the forces imparted to the nozzle assemblies causing them to rotate.

Still another object is to provide a washing apparatus wherein the speed limiting means for the nozzle assembly maintains the velocity of the spray delivered by nozzles of the nozzle assemblies at a desired value.

A further object is to provide a new and improved spray nozzle assembly for use in a vehicle washing apparatus.

A still further object is to provide a spray nozzle assembly having a speed limiting or control means for yieldably resisting rotation of the nozzle assembly with a force which varies in accordance with the speed of rotation.

A still further object is to provide a nozzle assembly wherein the speed control means comprises centrifugally operative means operatively connected to the nozzle assembly.

Figure 8:
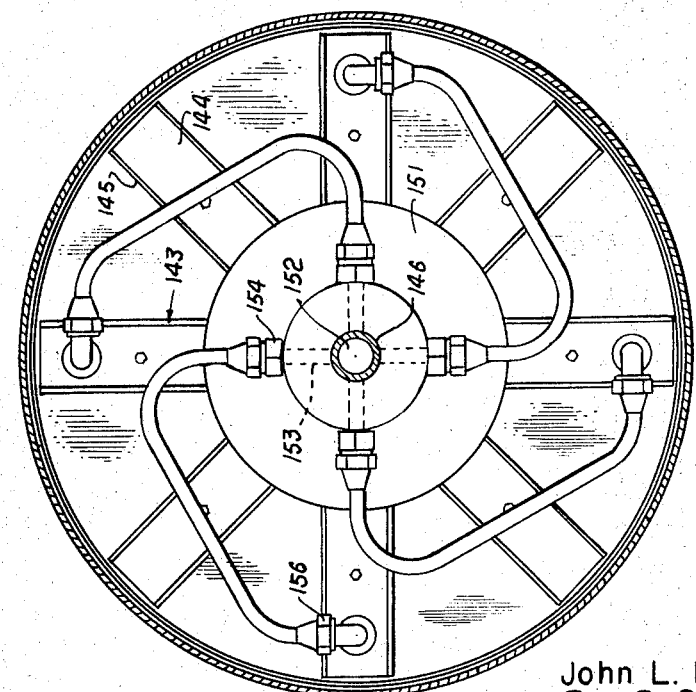
Figure 9:
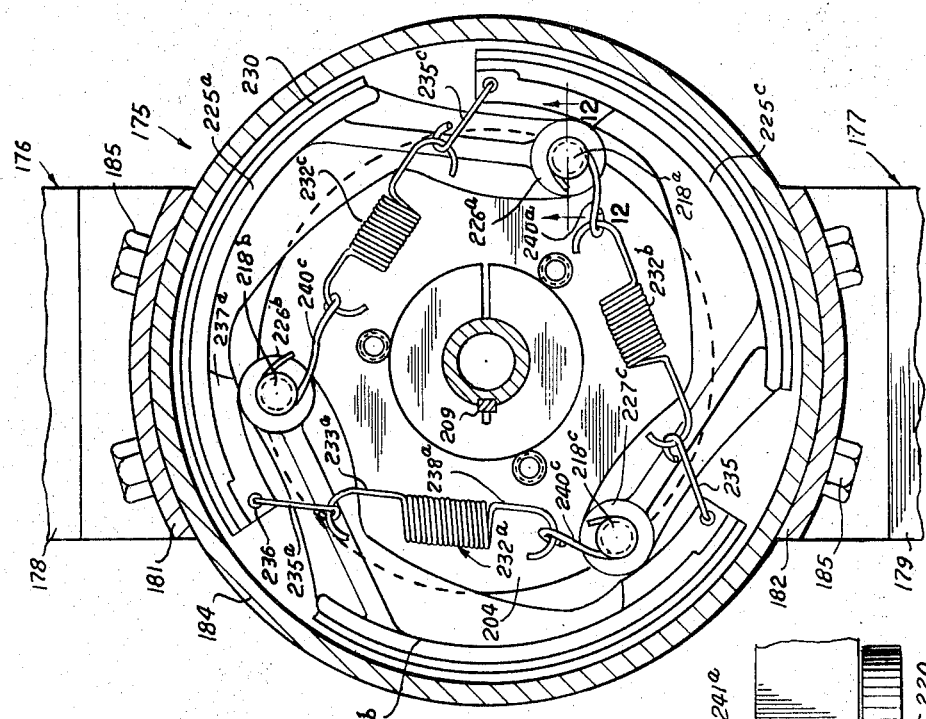
Figure 12:
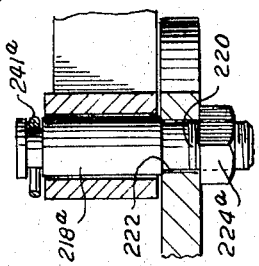
Figure 10:
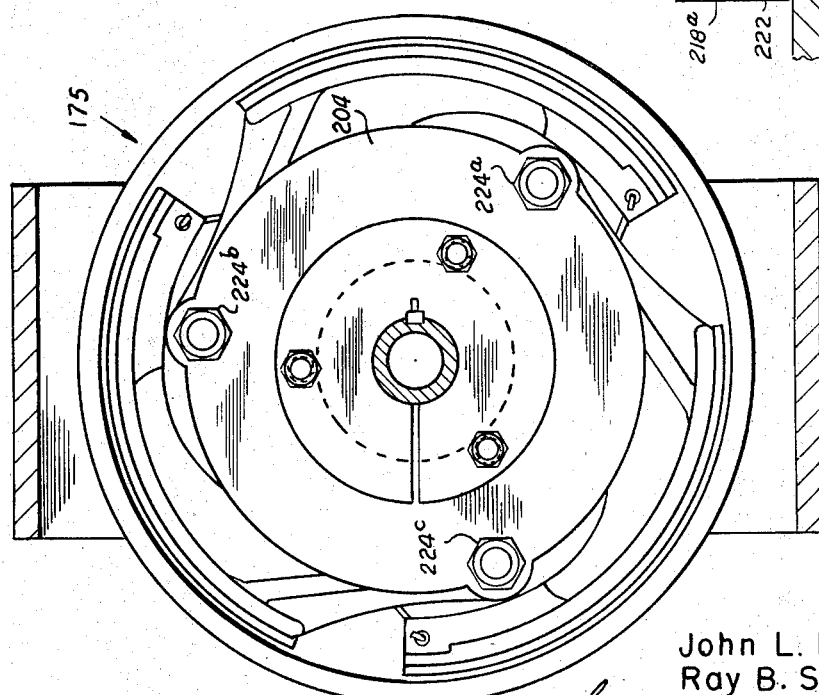

Additional objects and advantages of the invention will be readily apparent from the reading of the following description of the device constructed in accordance with the invention and reference to the accompanying drawings thereof, wherein:

FIG. 1 is the top view of a washing apparatus embodying the invention;
FIG. 2 is a sectional view taken on line 2—2 of FIG. 1;
FIG. 3 is a sectional view taken on line 3—3 of FIG. 2;
FIG. 4 is a sectional view taken on line 4—4 of FIG. 3;
FIG. 5 is a sectional view taken on line 5—5 of FIG. 4;
FIG. 6 is a vertical sectional view of the main rotary assembly of the apparatus;
FIG. 7 is a line sectional view with some parts broken away, taken on line 7—7 of FIG. 3;
FIG. 8 is a sectional view taken on line 8—8 of FIG. 7;
FIG. 9 is an enlarged sectional view taken on line 9—9 of FIG. 7;
FIG. 10 is an enlarged sectional view taken on line 10—10 of FIG. 7;
FIG. 11 is an exploded, partly sectional view, of the speed limiting assembly illustrated in FIGS. 9 and 10;
FIG. 12 is a sectional view taken on line 11—11 of FIG. 9;
FIGS. 13 and 14 are schematic views illustrating the direction of the sprays delivered by the nozzles of a nozzle assembly relative to the axis of rotation and the direction of its rotation;
FIG. 15 is a schematic illustration of an electric control system for the apparatus; and,
FIG. 16 is a fragmentary view of a modified form of the apparatus.

Referring now to the drawings, the washing apparatus 20 embodying the invention includes a track assembly 21 which is securable to a building structure or other overhead support. The track assembly includes a track frame 22, a plurality of C-shaped support plates 23 secured at their lower ends to the track frame in any suitable manner, as by welding, and longitudinally extending side beams 24 to which the upper ends of the support plates are similarly secured. The side beams in turn are rigidly securable to the transverse beams 22 of a support or building structure by means of tie plates 26 and bolts 27. The U-shaped track frame is thus spaced below the side beams with the C-shaped support plates providing clearance for the movement of the upper portions of a carriage 30 between the side beams and the track assembly.

The track assembly frame has a horizontal internal lower support track 32 secured in any suitable manner, as by welding, to the track frame. An upper reinforcing flange 43 is similarly secured to the track frame to provide strength and rigidity to the track assembly.

The carriage 30 includes a suitable frame 45 having a pair of vertical angle members 46 and 47 rigidly connected to one another by a lower channel member 49 which may extend between the parallel flanges 50 and 51 of the angle members 46 and 47, respectively, and be rigidly secured thereto in any suitable manner, as by welding, a middle bar 53 which is secured to the other flanges 55 and 56, respectively, of the vertical frame members 46 and 47 by bolts 58, and a transverse plate 60 which is secured to the flanges 55 and 56 of the vertical angle members by bolts 62.

The brackets 65 of the lower inner guide rollers 66, which are adapted to engage the internal surfaces of the track frame 22 below the support track, are also secured to the beam by the bolts 58. Similar upper inner guide rollers 70, rotatably mounted on brackets 71 secured to the plate 60 by the bolts 62, engage the internal surface of the support frame above the reinforcing flange 43.

A pair of bearing blocks 76 rigidly secured to the plate 60 by means of bolts, rotatably support a shaft 80 on whose lower end is rigidly mounted a carriage drive wheel 82 having the usual pneumatic tire which engages the track frame. A pulley 84 rigidly secured to the upper end of the shaft 80 is connected to the output shaft 85 of a speed reducing transmission 86 by means of a belt 87 and a pulley 88 rigidly secured to the output shaft. The speed reducing transmission is driven by an electric motor 88. The assembly of the electric motor 88 and the transmission 86, commercially available as a unit, is rigidly secured by bolts 91 to a mount plate 94 of the carriage which extends between the vertical carriage members 46 and 47 and is rigidly secured thereto in any suitable manner, as by welding. The bolts 91 extend through suitable slots 95 of the mount plate to permit adjustment of the position of the motor on the mount plate and thus the tension on the belt 87.

The carriage has a pair of upper outer guide rollers 96 which engage the upper outer surface of the track frame and which are rotatably mounted on brackets 97 secured by bolts 98 to an horizontal angle member 99 which is spaced outwardly of the track frame and is rigidly secured, as by welding, to the outer ends of a pair of angle members 100 rigidly secured, as by welding, to the upper ends of the vertical carriage members 46 and 47. The carriage also has a pair of lower outer guide rollers 102 rotatably mounted on brackets 103 which are secured by bolts 104 to an angle member 106 in turn secured, as by welding, to the outer ends of a pair of horizontal angle members 107 which extend outwardly from the vertical carriage members 46 and 47 and are rigidly secured thereto, as by welding.

The carriage is supported on the track flange 42 by a pair of rollers 108 suitably mounted on brackets 109 which are rotatably secured by bolts 109a to brackets 109b in turn secured to the plate 60 by bolts 109c.

A tubular vertical support 110 of the carriage is secured to a pair of L-shaped members 111 of the carriage, whose inner lower ends are secured, as by welding, to the vertical frame members 46 and 47, and whose upper ends are secured, as by welding, to the angle members 107, by means of a pair of or angle brackets 114. The horizontal flanges of the angle brackets rest on suitable flanges of the horizontal portion of the member 111 and are secured thereto by bolts 116 and their vertical flanges abut the opposite side walls of the support 110 and are secured thereto by bolts 117.

It will be apparent that while a carriage having a particular structure has been illustrated and described, the carriage may be formed in any other suitable manner as long as it is provided with suitable guide rollers, such as the tow pairs of upper and lower guide rollers which rotate about vertical axes and hold the carriage against lateral displacement on the track frame, the support rollers 108 which ride on the track flange 42 and support the carriage against downward movement, and a drive wheel which engages the track frame to move the carriage thereabout when the motor 88 is energized.

The tire of the drive wheel is, of course, inflated sufficiently to cause it to maintain a desired frictional contact with the inner surface of the track frame.

Sufficient play is provided by the means mounting the guide rollers and by the rollers, which may also have rubber tires which may compress resiliently, to permit the outer and inner guide rollers to move relative to the track as required during the movement of the carriage about the curved portions of the track.

A pair of vertically spaced side nozzle assemblies 125 and 125a, FIG. 7, are mounted on the lower end of the support 110. The lower side nozzle assembly 125 includes a hollow shaft 126 which extends through suitable aligned apertures in the sides 127 and 128 of the support 110 and is rotatably mounted thereon by means of suitable bearing assemblies 131 and 132 which are rigidly secured to the column or support member by bolts 133.

The side nozzle assembly 125 includes a spray wheel 140 provided with a peripheral outwardly extending flange 141. Channel shaped brace members 143 of the spray wheel have webs 144 which abut the rear surface of the wheel and are rigidly secured thereto by bolts 144a. The parallel flanges 145 of the brace members extend outwardly from the wall.

A manifold 150 threaded on the hollow shaft 126 has an external annular flange 151 which overlaps the inner end portions of the brace members and is rigidly secured to the flanges thereof by welding. The manifold has a central chamber 152 to which the passage of the hollow shaft 126 opens and a plurality of circumferentially spaced ports 153 in whose outer ends are threaded suitable fittings or connectors 154. Conduits 155 connected at their inner ends to the fittings extend outwardly in a curved manner therefrom to suitable fittings 156 which connect their outer ends to spray nozzles 157. Each fitting assembly includes a nipple 158 which extends through aligned apertures in the web of its brace member and the wheel 140. The nozzles have rigid members threaded in the nozzles and adjustable members which may be inclined as desired to direct sprays of liquid toward the axis of rotation of the wheel and also angularly relative to the radius of the wheel to cause the wheel to rotate when liquid under pressure supplied to the hollow shaft sprays outwardly at relatively high velocity through the nozzles.

A circular shield 160 is secured to the support 110, as by means of the bolts 133 which secure the bearing assemblies to the support member. The inner portion of the shield extends between the bearing assembly and the side 127 of the support 110.

The speed of rotation of the nozzle assembly 125 is limited or restrained by a speed limiting or control assembly 175 which is rigidly secured to the column 110 by suitable mount brackets 176 and 177 provided with legs 178 and 179, respectively, which abut the outer surfaces to the side 128 of the support 110 and are rigidly secured thereto by bolts 180. The outer ends of the brackets 176 and 177 are provided with acurate flange portions 181 and 182, respectively, which abut the outer surface of a cylindrical drum 184 of the speed limiting assembly 175 and are rigidly secured thereto by means of screws 185 which extend through suitable apertures and the arcuate flanges 182 into threaded blind bores 186 of the drum. The outer end of the shaft 126 is secured by a hollow connector shaft 189 to the rotatable member 190 of a swivel union 191 whose stationary member 192 is telescoped in a ring 194 rigidly secured to the top wall 195 of the drum, as by welding. The union member 192 is rigidly secured to the ring by a set screw 197 threaded in a suitable radial bore of the ring. The ring is aligned with a central aperture 199 of the top wall and the coupling shaft 189 extend therethrough.

The connector shaft has an internally threaded end portion 201 in which the rotatable union member 190 is threaded and a similar internally threaded end portion 202 in which the outer end of the hollow shaft 126 is threaded. The directions of threads of the connector shaft are such that the rotation of the nozzle assembly tends to tighten the connections between the connector shaft, the hollow shaft 126 and the inner member 190.

The coupling shaft 189 has rigidly secured thereto a shoe mount plate 204 by means of a tapered bushing 205 and a key which is receivable in the longitudnal alignable slots 208 and 209 of the bearing and the hollow shaft, respectively.

The tapered bearing is telescopical in the hub 210 of the shoe mount plate and over the connector shaft 189 and is provided with an external flange 211 whose inner surface 213 is engageable with the end surface 214 of the hub 210 and is securable thereto by means of screws 216. The screws extend through suitable apertures in the bushing flange into suitable threaded bores of the hub. Due to the taper of the split bushing, as the bushing is forced inwardly as the socket head screws are threaded into the bores, the tapered bushing acts as a wedge to rigidly secure or clamp the shoe mount plate to the connector shaft. A plurality of pivot posts 218a, 218b and 218c are secured to the mount plate by means of their threaded reduced end portions 220 which extend through the apertures 222 of the mount plate and are secured thereto by suitable nuts 224a, 224b and 224c. Arcuate shoes 225a, 225b and 225c are pivotally rotated on the pivot posts 218a, 218b and 218c, respectively, by means of the hubs 226a, 226b and 226c on the outer ends of their arms 227a, 227b and 227c, respectively. The shoes are provided with friction linings 230 which are engageable with the internal surfaces of the drum 184.

The shoes 225a, 225b and 225c are biases inwardly toward the portions illustrated in FIGS. 9 and 10, respectively, by springs 232a, 232b and 232c. One hooked end 233a of the spring 232a extends through the end eye portion of a connector wire 235a whose other hooked end extends through an aperture 236a in the internal rib 237a of the shoe 225a. The other hooked end 238a of the sprin 232a extends through the end eye portion of a connector wire 240a whose other hooked end portion is received in the annular groove 241c of the pivot post 218c. The spring extends outwardly of the groove. The shoe 225b is similarly biased by the spring 232b similarly connected to the shoe 225b by a connector wire 235b and to the post 218a by a connector wire 240b. The spring 232c which biases the shoe 225c is connected to the shoe 224c by a connector wire 235c and to the post 218c by a connector wire 240c.

It will be apparent that as the speed of rotation of the nozzle assembly 125 and therefore of the nozzle connector shaft 189 increases, centrifugal force acting on the shoes tends to pivot them outwardly about the axes of their pivotal connections with the pivot posts and the friction linings of the shoes engage the internal surface of the drum. The frictional engagement of the shoes and the drum resists the rotation of the nozzle assembly with a force which increases in accordance with the speed of rotation. The speed limiting assembly 175 in effect acts as a yieldable restaining force on the nozzle assembly. The degree of force with which the speed limiting assembly 175 resists rotation of the nozzle assembly for a given speed of rotation of the nozzle assembly may be preset by selecting springs of appropriate strength.

In order to supply wash and rinse liquids under pressure to the nozzle assembly 125, the stationary member 192 of the swivel union 191 is connected to the rotary member 250 of a main swivel union 251 of a swivel assembly 252 by conduit means which may include a nipple 254 threaded in the bore 255 of the stationary union member 192, an elbow 255, a nipple 256, an elbow 257, a pipe 258, elbow 259, a nipple 269, a T-coupling 261, a flexible conduit 262 connected to the T-coupling by a suitatble connector assembly 263, the flexible conduit extending into the support through a tubular member 264 and upwardly though the support 110, an elbow 265 connected to the top end of the flexible conduit by a suitable connector assembly 266, an elbow 270, a pipe 271, which is rigidly secured to the vertical carriage frame member 47 by suitable clamps 272, a flexible conduit 273 connected at one end to the top end of the pipe 271 by a suitable connector assembly 274, a rigid pipe 275 connected to the other end of the flexible conduit 273 by a connector assembly 276, a coupling collar 277 and a nipple 278.

The nozzle assembly 125a and its speed limiting assembly 175a being identical in structure to the nozzle assembly 125 and its speed limiting assembly 175, the elements of the nozzle assembly 125a and its speed limiting assembly 175a have been provided with the same reference numerals, to which the suffix a has been added, as the corresponding elements of the nozzle assembly 125 and its speed limiting assembly 175.

The stationary member 192a of the swivel union 191a is connected by a nipple 280 to the T-coupling 261.

The carriage also includes a horizontal member or beam 282 rigidly secured to the support 110 and to a pair of brace plates 283, the horizontal beam and the plates being rigidly secured to one another and to the support 110 in any suitable manner, as by welding. A pair of nozzle assemblies 125b and 125c and their speed limiting assemblies 175b and 175c, respectively, mounted on the horizontal beam are identical in structure to the nozzle assembly 125 and its speed limiting assembly 175, and, accordingly, the elements of the nozzle assemblies 125b and 125c and their speed limiting assemblies 175b and 175c have been provided with the same reference numerals, to which the suffices b and c, respectively, have been added, as the corresponding elements of the nozzle assembly 125 and its speed limiting assembly 175.

The fixed member 192b of the swivel union 191b is connected to the T-coupling 268 by a nipple 291, an elbow 292, a nipple 293, an elbow 294, a pipe 295, an elbow 296, a nipple 297, a T-coupling 298, a flexible conduit 299 one of whose ends is connected to the T-coupling 298 by a suitable connector assembly 300 and whose other end is connected by a suitable coupling assembly 301 to a nipple 302, an elbow 303, a pipe 304, an elbow 305, elbows 305 and 306 which are connected by the nipple 307, and the nipple 308.

The stationary member of the main swivel union 251, FIG. 6, is connected by a suitable coupling 311 to a pipe 312 rigidly secured by suitable clamps or bolts 313 to a pipe transverse frame member 315 of the track assembly which is secured to the frame side members 22 in any suitable manner, as by welding.

The speed of rotation of each nozzle assembly, if the action of the speed limiting assembly is disregarded, is predetermined by the pressure of the liquids delivered to the main swivel union 251, the effective orifices of the nozzles, the degree or angle of their inclination relative to the axis and the direction of the rotation of the nozzle assembly, and the distance of the nozzle from the axis of the rotation of the nozzle assembly.

The speed limiting assemblies 175 automatically control or limit the speed of rotation of the nozzle assemblies to prevent excessive speeds of rotation and to insure that the velocity with which the sprays from the nozzles impinge on the surfaces of the vehicle is maintained at a desired high value.

It will be apparent that if the forces resisting rotation of a nozzle assembly 125 are small, its speed of rotation, for a given value of the pressure of the liquid supplied thereto, caused by the reaction forces of the liquid being sprayed from its nozzles will be relatively high and, while the velocity of the sprays issuing from the nozzles relative to the nozzles themselves may be high, the velocity of the sprays relative to the vehicle at the location of their impingement with the vehicle will be very low.

If the forces resisting rotation of a nozzle assembly are very great, as occurs if the nozzles are spaced a relatively great distance from the axis of rotation, the velocity of the sprays at the locations of their impingement with the vehicle will be relatively low and much of the energy of the liquid under pressure from the nozzles is expended in imparting rotation to the nozzle assembly. The mechanical forces exerted on the dirt adhering to the vehicle will be small and in addition since the speed rotation of the nozzle assembly is low, the number of times each point on the vehicle's surface is subjected to sprays is also low.

If the spray assemblies are not provided with the speed limiting assemblies, the speed of their rotation for a given pressure of the liquid supplied thereto will vary greatly as the effective orifices of their nozzles change due to wear or clogging, the angular relationship of the nozzles to the spray wheel changes due to accidental forces supplied thereto, or the frictional forces resisting their rotation change due to wear and the like. In addition, if the pressure of the liquid supply varies and the nozzle assemblies are not provided with the speed limiting or control assemblies, the speed of rotation will vary accordingly.

It will be apparent that by providing nozzle assemblies whose nozzles are spaced a relatively short distance from the axes of rotation thereof and the use of two such nozzle assemblies for washing the upwardly facing surfaces of a vehicle and two side or vertical surfaces of a vehicle, the speed of rotation the nozzle assemblies may be relatively high for a given velocity of impingement of the sprays on the surface of the vehicles so that each point on the vehicle is subjected to a related great number of impingements of a relatively high velocity spray during each movement of the carriage about the vehicle.

For example, the nozzles of each nozzle assembly may be spaced between nine and twelve inches from the axis of rotation of the nozzle assembly and the orifices of the nozzles and the springs of the speed limiting assemblies may be chosen to cause the nozzle assemblies to rotate at a speed of approximately 140 revolutions per minute when the apparatus is supplied with liquid under pressure of 600 pounds per square inch.

As the nozzle assemblies rotate, the wash liquid from the nozzles of the spray assemblies is directed at the external surfaces of the vehicle repeatedly and at varying angles of incidence as the nozzles are rotated and the carriage moves about the vehicle. For example, as the carriage, FIG. 2, moves in a clockwise direction about the track frame and the spray wheel of the side nozzle assembly rotates in a counterclockwise direction, FIG. 13, particles or films of dirt adhering to the vertical surfaces of the vehicle at a location forewardly of the movement of the side nozzle assembly are first subjected to high velocity sprays of wash liquid which are directed downwardly and, as the nozzle assembly moves past such location, such surfaces of the vehicle and subjected to upwardly directed sprays of the wash liquid. The subjection of the surfaces of the vehicle repeatedly to sprays of high pressure wash liquid whose angle of incidence to the surfaces at the locations of impingement therewith varies as the carriage moves about the vehicle, causes mechanical forces to be applied to the dirt particles and film to dislodge such dirt particles and film from the surfaces of the vehicle. The successive impingement of the sprays in effect hammers or knocks off the dirt. The hot wash liquid also tends to dissolve dirt adhering to the vehicle. Such dissolution of the dirt is facilitated by the action of the chemical in the usual well known manner.

After the carriage has made one complete movement about the vehicle, during which the surfaces of the vehicle have been subjected to sprays of wash liquid directed at continuously varying angles of incidence to the surfaces, these surfaces are wettened by the wash liquid which tends to penetrate, soften and dissolve any remaining dirt adhering to the surfaces. If it is desired the surfaces of the vehicle be treated with the wax as the carriage begins its second movement about the tracks, the operators opens the switch 423 and closes the switch 418 and a mixture of hot water and the wax agent is then supplied to the nozzles of the spray assemblies. As the carriage makes the second complete movement about the vehicle, the external surfaces of the vehicle are subjected to sprays of this solution which further tends to wash off the dirt and also deposits a coating or film of the wax agent on the vehicle. As the second movement of the carriage about the vehicle is completed, the operator opens the switch 423 and only hot rinse water is then delivered to the nozzle assemblies. The sprays of hot water then wash any remaining detergent and excess wax off the vehicle during the third complete movement of the carriage about the track and the vehicle. Upon completion of the third movement of the carriage above the track, the operator opens the switch 401. The carriage is then again at the side of the vehicle, as for example, in the position illustrated in FIG. 1 and the washed vehicle may then be driven forwardly from beneath the track.

The sprays of liquid from the nozzles of the top nozzle assemblies when the carriage is at the side of the vehicle subject overlapping areas of the upwardly facing surfaces of the vehicle which extend over more than half its width and also impinge on the upper portions of the upwardly and inwardly sloping side surfaces of the vehicle so that all areas of the upwardly facing surfaces of the vehicle are subjected to the sprays from the top nozzle assemblies during each movement of the carriage about the track.

Similarly, the sprays from the side nozzle assemblies subject overlapping areas of the vertical surfaces of the vehicle, which extend to a level below the top edge portion of the vertically slidable side windows of the vehicle, so that all vertical surfaces of the vehicle are also subjected to the sprays of liquid during each movement of the carriage about the track.

The swivel assembly 252 includes a pair of conductive collector rings 316 and 317 mounted on the pipe 312 by means of an insulating sleeve 318 rigidly secured to the pipe. The insulated electric conductors 320 and 321 of a cable 327 are connected to the rings 316 and 317, respectively. The conductor 321 extends downwardly of the top collector ring 316 through a suitable aperture in the top collector ring and is insulated from the top collector ring. A pair of brush holders 324 and 325, whose brushes 326 and 327 are in slidable electric contact with the collector rings 316 and 317, respectively, are mounted by means of a bolt 328 on the horizontal arm 330 of a bracket 331. The brushes may be of any suitable type, such as carbon brushes spring biased toward the collector rings and connected to the electrical conductors 332 and 333 of a cable 334. The bracket 331 is provided at its lower end with a hub 336 mounted on the nipple 268 and secured, by the set screw 337. The bracket may be formed of two sections which are bolted together to facilitate its assembly to the other swivel assembly components if desired.

A spray shield 340 of the swivel assembly may include a tubular housing 341 whose reduced lower end portion 342 is telescoped over the rotating member 250 of the swivel union 251 and is secured thereto in any suitable manner, as by a set screw 434. A cover 435 of the spray shield is secured to the pipe 312 by set screws 346 and has a dependent peripheral flange 347 which telescopes over the upper end of the housing. The cable 322 extends upwardly from the spray shield through a suitable seal or bushing 348 secured to the cover while the cable 334 extends through a suitable seal bushing 349 secured to the housing 311.

The top end of the stationary pipe 312 of the swivel assembly 252 is connected to a supply conduit 350, which is connectable to a suitable source of hot water under pressure, by means of an elbow 351, a nipple 352, a T-coupling 353, a nipple 354, and a solenoid valve 355. A wash agent from a supply conduit 360 connected to a source of the liquid agent under pressure, may be introduced into the hot water flowing to the pipe 312, the supply conduit 360 being connected to an inlet of the T-coupling 353 by a nipple 361, a T-coupling 362, a nipple 363, and a solenoid valve 364. Another agent such as a liquid wax solution may be admixed to the hot water flowing to the pipe 312 from a conduit 350 connected to a suitable source of such agent by means of a nipple 371 which is connected to an inlet of the T-coupling 362, a solenoid valve 372, a nipple 373, and an elbow 374. It will be apparent that when only the solenoid valve 355 is open, hot water will be supplied to the two nozzle assemblies; that when the solenoid valves 355 and 364 are open, a mixture of hot water and chemical, such as a detergent, i.e., wash liquid, is supplied to the nozzle assemblies; and that when the valves 335 and 372 are open, a mixture of hot water and chemical is supplied to the nozzle assemblies.

A suitable cover or housing 375 is provided to cover the upper portion of the carriage.

Any suitable controls may be provided for selectively controlling operation of the valves and of the electric rotor which drive the carriage motor. In FIG. 15 is illustrated a circuit which may be operated manually by an operator of the washing apparatus although, if desired, a suitable coin operated control circuit of the general type illustrated and described in our co-pending application Ser. No. 545,496, filed Apr. 26, 1966, may be employed to cause the apparatus during the first complete cycle of the travel of the carriage about the track to spray a hot solution of chemical and water on the top and side surfaces of the vehicle, a solution of hot water and wax agent during the second complete movement of the carriage about the vehicle and the track, and only hot water rinse during the third and final movement of the carriage about the track and about the vehicle.

Referring now particularly to FIG. 5, the control circuit may include a manually operable switch 401 whose contacts 402 and 403 when the switch is in closed position connect the conductors 320 and 321 of the cable 322 to an input circuit 405 of electric current by means of the main lines or conductors 406 and 407, respectively. The carriage motor 88 is connected across the conductors 332 and 333 which are connected to the brushes 326 and 327, respectively. A third contact 410 of the main switch connects the solenoid of the valve 335 across the main lines 406 and 407 by means of the conductors 412, 414, 415 and 416. The solenoid of the valve 344 is connectable across the main lines by the conductor 412, a manually operable switch 418 and the conductors 419 and 416. Similarly, the solenoid of the valve 352 is connectable across the main lines by the conductors 412 and 422, a switch 423, and the conductors 424, 425 and 416.

In use, the vehicle to be washed is driven to a predetermined position below and within the track 22 being guided to such position by means of guide rails 430, 431 and 432, which are engageable by its wheels. Suitable stop means or indicating means may be provided to give a visual or other indication to the driver of the vehicle when his car reaches a proper central position below the track. The driver of the vehicle may now remain in the vehicle or may step out of it. The operator of the apparatus then closes the switches 401 and 418 simultaneously, the carriage motor 88s energized and drives the carriage around the track frame, and the valves 355 and 364 are opened and a mixture or solution of hot water and wash agent is supplied to the nozzles of the nozzle assemblies.

The nozzles of the upper side nozzle assembly 125 direct sprays of liquid at the portions of vertical or side surfaces of the vehicle immediately below the lower edges of the closed vertically movable side windows of the vehicle in order that the sprays of liquid do not impinge upwardly and inwardly at the locations at which the seals or gaskets of the vehicle are engaged by the top portions of the windows. Such seal means are not designed to prevent forcible upward and inward flow of liquid between the top edge portions of the windows and such gasket or seal means.

The sprays of liquid from the nozzles, as illustrated in FIGS. 13 and 14, are directed opposite to the direction of rotation of the spray wheels and toward the horizontal axis of their rotation.

The nozzles of the top spray assemblies 125b and 125c of the liquid substantially downwardly at the upwardly facing surfaces of the vehicle and also at the top portion of the side surfaces thereof. The sprays from the nozzles of the spray assemblies 125a and 125c overlap at the upper portions of the vertically movable windows of the vehicle. The high velocity sprays for the nozzles of the top nozzle assemblies 125b and 125c are directed downwardly at the upper end positions of the windows and this does not tend to cause water to move forcibly upwardly between the top edge portions of the windows and the gaskets which engage them. The nozzles of the top nozzle assemblies also direct sprays of liquid toward and opposite to the direction of rotation of the nozzle assemblies and toward the axis of rotation.

Referring now particularly to FIG. 16, liquid may be supplied to the stationary members of the nozzle assemblies 125 and 125a through a rigid pipe 500 secured to a side of the support 110 instead of the flexible conduit 262, a T-coupling 502 one of whose outlets is connected to the stationary member 192a of the swivel union 191a of the nozzle assembly 125a by a somewhat flexible conduit 503 and whose other outlet is connected to the stationary member 192 of the swivel union 191 of the nozzle assembly 125 by a rigid pipe 504, an elbow 505 and a somewhat flexible conduit 506. The drums 184a and 184 are rigidly secured to the stationary members 192a and 192, respectively, but the drums are not secured to the support by brackets, such as the brackets 176 and 177. This flexible conduit, which may have wire brade, holds the stationary members of the swivel union against rotation while permitting some movement thereof to facilitate the assembly of the nozzle assemblies 125 and 125a on the carriage since in this case the swivel union will be free to align itself with the bearing assemblies 131 and 132. It will be apparent that the top nozzle assemblies 125b and 125c may also have the liquid supplied to their stationary members by similar somewhat flexible conduits.

It will now be seen that a new and improved apparatus for washing liquids has been illustrated and described which includes a carriage movable about a closed track on which are mounted a pair of nozzle assemblies rotatable about spaced horizontal axes for directing rotating sprays of liquid on side surfaces of a vehicle positioned within the track and a pair of top nozzle assemblies rotatable about spaced vertical axes for directing rotating sprays of liquid on upwardly facing surfaces of the vehicles and that the areas of the vehicle subjected to sprays of adjacent pairs of nozzle assemblies overlap to cause all side and upwardly facing surfaces of the vehicle to be subjected to sprays of liquid.

The foregoing description of the invention is explanatory only, and changes in the details of the construction illustrated may be made by those skilled in the art, without departing from the spirit of the invention.

What is claimed and desired to be secured by Letters Patent is:

1. A vehicle washing apparatus including: a substantially rectangular track means; a carriage mounted for movement about said track means; drive means on said carriage for moving said carriage about said track means when said drive means is energized; a top nozzle assembly mounted on said carriage for directing sprays of liquid substantially downwardly on upwardly facing surfaces of a vehicle positioned within said track means as said carriage moves about said track means; a side nozzle assembly mounted on said carriage for directing sprays of liquid at portions of the side surfaces of the vehicle below the top portions of the vertically movable windows thereof as said carriage moves about said track means; means for supplying liquid under pressure to said nozzle assemblies; said nozzle assemblies being rotatable by the force of the liquid being sprayed thereby; and individual speed control means responsive to the speed of rotation of said nozzle assemblies for applying a force yieldably resisting rotation thereof which varies in accordance with the speed of rotation thereof, said top nozzle assembly including a plurality of nozzles rotatable and spaced about a substantially vertical axis and said side nozzle assembly including a plurality of nozzles rotatable and spaced about a substantially horizontal axis, said nozzles of each of said nozzle assemblies being positioned to direct sprays of liquid in directions inclined toward the axis of rotation of said nozzles and also inclined opposite to the direction of the rotary movement of said nozzles, said means for supplying liquid to said nozzles including first and second rotary unions mounted on said carriage and a main rotary union spaced from said carriage, each of said unions having a stationary member and a rotary member, and conduit means connecting the stationary members of said first and second rotary unions with the rotary member of said main union, said speed control means comprising separate means operatively associated with said rotary members of said first and second rotary unions and resisting rotation of said rotary members of said first and second members in accordance with the speeds of rotation thereof, the separate means of each said speed control means including a drum rigid with the stationary member of the rotary union of its nozzle assembly and means rotatable with the rotary member of the rotary union and movable outwardly by centrifugal force into frictional engagement with said drum.

2. The vehicle washing apparatus of claim 1, wherein the stationary member of said main union is disposed within said track means.

3. A vehicle washing apparatus including: a substantially rectangular track means; a carriage mounted for movement about said track means; drive means on said carriage for moving said carriage about said track means when said drive means is energized; a top nozzle assembly mounted on said carriage for directing sprays of liquid substantially downwardly on upwardly facing surfaces of a vehicle positioned within said track means as said carriage moves about said track means; a side nozzle assembly mounted on said carriage for directing sprays of liquid at portions of the side surfaces of the vehicle below the top portions of the vertically movable windows thereof as said carriage moves about said track means; means for supplying liquid under pressure to said nozzle assemblies; said nozzle assemblies being rotatable by the force of the liquid being sprayed thereby; and individual speed control means responsive to the speed of rotation of said nozzle assemblies for applying a force yieldably resisting rotation thereof which varies in accordance with the speed of rotation thereof, said means for supplying liquid to said nozzle assemblies including first and second rotary unions mounted on said carriage and a main rotary union spaced from said carriage, each of said unions having a stationary member and a rotary member, and conduit means connecting the stationary members of said first and second rotary unions with the rotary member of said main union, said speed control means each comprising a drum rigid with said carriage and means engageable with said drum and rotatable with said conduit means of its associated nozzle assembly and movable outwardly by centrifugal force into frictional engagement with said drum.

4. A vehicle washing apparatus including: a substantially rectangular track means; a carriage mounted for movement about said track means; drive means on said carriage for moving said carriage about said track means when said drive means is energized; a pair of top nozzle assemblies mounted on said carriage and rotatable about spaced substantially vertical axes for directing overlapping sprays of liquid on upwardly facing surfaces of a vehicle positioned within said track means as said carriage moves about said track means; a pair of side nozzle assemblies mounted on said carriage for rotation about spaced substantially horizontal axes for directing overlapping sprays of liquid at portions of the side surfaces of the vehicle positioned within said track means as said carriage moves about said track means; means for supplying liquid under pressure to said nozzle assemblies, said nozzle assemblies being rotatable by the reaction force of the liquid being sprayed thereby; and individual speed control means responsive to the speeds of rotation of each of said nozzle assemblies for applying a force yieldably resisting rotation of each nozzle assembly which varies in accordance with the speed of rotation thereof, each of said nozzle assemblies including a plurality of nozzles spaced from and about the axis of rotation of its nozzle assembly, said nozzles of each of said spray assemblies being positioned to direct sprays of liquid in directions inclined and opposite to the direction of rotary movement of said nozzle, said means for supplying liquid to each of said nozzles including rotary unions mounted on said carriage and a main rotary union spaced from said carriage, each of said unions having a stationary member and a rotary member, and conduit means connecting the stationary members of the rotary unions of said nozzle assemblies with the rotary member of said main union, said speed control means each comprising separate means operatively associated with the rotary union of each of the nozzle assemblies and resisting rotation of said rotary members of said nozzle assemblies in accordance with the speeds of rotation thereof, said separate means of each said speed control means including a drum rigid with the stationary member of the rotary union of its nozzle assembly and means rotatable with the rotary member of the rotary union and movable outwardly by centrifugal force into frictional engagement with said drum.

References Cited

UNITED STATES PATENTS

| | | | |
|---|---|---|---|
| 1,637,376 | 8/1927 | Gibney | 134—112 XR |
| 1,857,766 | 5/1932 | Peterson | 239—252 XR |
| 2,602,003 | 7/1952 | Wellborn. | |

OTHER REFERENCES

Serial No. 667,780; applicants co-pending application filed Sept. 14, 1967.

Automatic Car Wash Association; St. Louis convention photographs; July 27, 1967.

Kwiki Whirlaway; Autolaundry News; vol. 14, No. 11; p. 38; Nov. 23, 1965.

ROBERT L. BLEUTGE, Primary Examiner

U.S. Cl. X.R.

134—123, 179; 239—209, 251, 252